United States Patent [19]

Meda

[11] Patent Number: 4,471,537
[45] Date of Patent: Sep. 18, 1984

[54] DRYER APPARATUS HAVING AN IMPROVED AIR CIRCULATION

[75] Inventor: Carlo Meda, Volpiano, Italy

[73] Assignee: Indesit Industria Elettrodomestici Italiana S.p.A., Turin, Italy

[21] Appl. No.: 339,937

[22] Filed: Jan. 18, 1982

[51] Int. Cl.³ .............................................. F26B 9/06
[52] U.S. Cl. ........................................... 34/77; 34/225
[58] Field of Search ............... 34/77, 76, 78, 225, 34/233, 196

[56] References Cited

U.S. PATENT DOCUMENTS 3,739,487 6/1973 Clark ........................................ 34/78
4,145,818 3/1979 Kulling ..................................... 34/10

FOREIGN PATENT DOCUMENTS 1133098 11/1968 United Kingdom .

*Primary Examiner*—Larry I. Schwartz
*Attorney, Agent, or Firm*—Sughrue, Mion, Zinn, Macpeak & Seas

[57] ABSTRACT

A dryer apparatus comprising an enclosure which contains a drying chamber for receiving articles, such as clothes, to be dried, an air heating passage and an air cooling passage. The heating passage is situated underneath the drying chamber and has inlet means and outlet means communicating therewith on opposite sides of said chamber, respectively. Air heating means are provided in the heating passage between the inlet and outlet means threof to heat air flowing through said heating passage. The cooling passage is situated beside the drying chamber and has inlet means which are situated at the top of both the drying chamber and the cooling passage, and outlet means at the bottom of the cooling passage, which outlet means communicate with the heating passage near the inlet means thereof. Air cooling means are provided in the cooling passage, between the inlet and outlet means thereof to condense moisture from air flowing downwardly in the cooling passage. Water collecting or draining means are provided underneath the outlet means of the cooling passage to collect water dripping from the cooling means. The arrangement is such that a major air flow is circulated by natural convection between the drying chamber and the heating passage and a minor air flow is circulated by natural convection from the drying chamber to the heating passage through the cooling passage.

21 Claims, 4 Drawing Figures

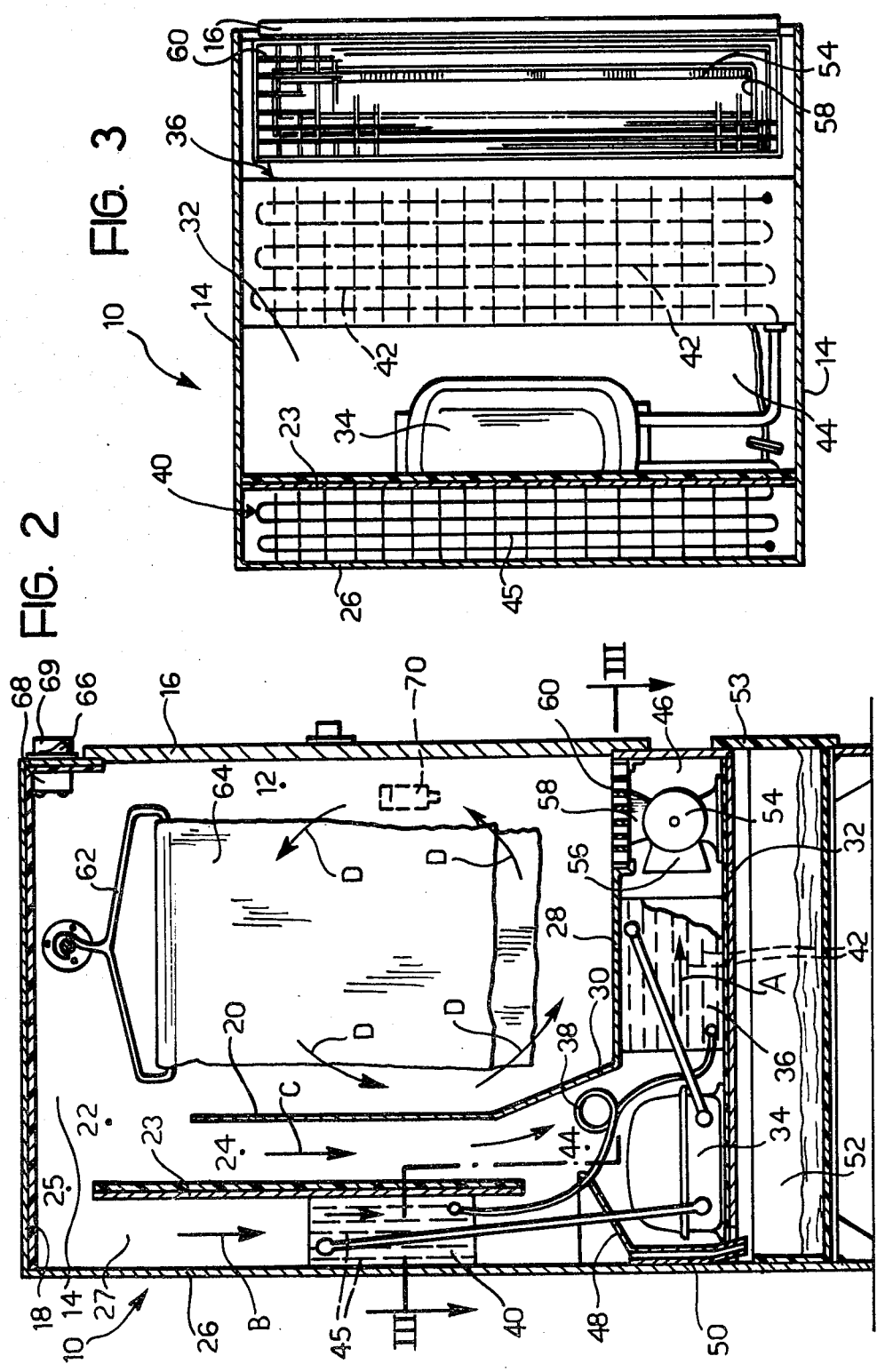

DRYER APPARATUS HAVING AN IMPROVED AIR CIRCULATION

BACKGROUND OF THE INVENTION AND STATEMENT OF PRIOR ART

This invention relates to drying apparatus especially adapted to domestic use for drying clothes, but which may be advantageously used for drying various articles in industry.

More particularly, the invention relates to a dryer apparatus comprising an enclosure which contains a drying chamber for receiving articles to be dried, an air heating passage and an air cooling passage, wherein the heating passage is situated underneath the drying chamber and has inlet means and outlet means communicating therewith on opposite sides of said chamber, respectively, air heating means being provided in the heating passage between the inlet and outlet means thereof to heat air flowing through said heating passage, and wherein the cooling passage is situated beside the drying chamber and has inlet means through which the drying chamber communicates with the top of the cooling passage and outlet means at the bottom of the cooling passage, which outlet means communicate with the heating passage near the inlet means thereof, air cooling means being provided in the cooling passage, between the inlet and outlet means thereof, to condense moisture from air flowing downwardly in the cooling passage, and water collecting or draining means being provided underneath the outlet means of the cooling passage to collect water dripping from the cooling means, the arrangement being such that a major air flow is circulated between the drying chamber and the heating passage and a minor air flow is circulated from the drying chamber to the heating passage through the cooling passage.

A dryer apparatus of the above kind is known from British Patent Specification No. 1,133,098 to Randell.

In such known apparatus the inlet means of the cooling passage are constituted by an interspace between two vertical walls facing each other. The inlet of the interspace is a slit near the bottom of the drying chamber. The top of the interspace communicates with the top of the cooling passage.

It is known that energy can be spared, when drying clothes or the like, in an apparatus of the above kind by flowing a minor proportion of the air through the cooling passage and circulating a major proportion of the air through the heating passage and the drying chamber only. The energy spared is due to the fact that a relatively low air flow past the cooling means gives rise to a relatively low loss of sensible heat from the moist air and thus the heating means require relatively low energy to make-up the sensible heat which has been removed by the cooling means.

In the Randell apparatus the flow path to the cooling passage has its inlet at the bottom of the drying chamber and thus it is practically impossible to obtain a downward air flow in this passage by convection. A fan or similar blower is therefore necessary to this purpose. The fan must be in operation from the very beginning to the end of the drying cycle of the apparatus. A great proportion of the energy which would be spared by circulating only a minor proportion of air through the cooling passage is thus lost in energising the fan.

OBJECT OF THE INVENTION

The invention has for its object to provide a dryer apparatus of the aforesaid kind, which allows to spare more energy by not requiring the use of a fan or the like or requiring its use only as a slight aid to air circulation or during some stages of the drying cycle.

According to the invention this object is attained by a dryer apparatus of the aforesaid kind, characterised in that the inlet means of said cooling passage are situated at the top of both the drying chamber and the cooling passage.

In a dryer apparatus according to the invention the cooling passage, being open to the drying chamber at the top and to the heating passage at the bottom, acts, as it were, as an "inverted stack" in which a downward draught is induced by natural convection due to the density difference between the relatively hot moist air at the top of the drying chamber and the relatively cold dry air at the inlet of the heating passage. The density difference is relatively high at the beginning of the operation of the apparatus when the air at the top of the cooling passage is highly saturated with humidity and the air at the bottom of the cooling passage has lost a great amount of water by condensation on the cooling means.

The inlet means of the cooling passage at the top of the drying chamber have the advantage of acting as an air intake only for the air which has the highest moisture contents. This improves the efficiency of moisture removal since it allows the cooling means to constantly operate in the presence of the highest available moisture contents.

The air density difference and thus the air flow rate past the cooling means may decrease as the drying operation proceeds, due to a progressive increase of the temperature of the cooling means and the ensuing progressive decrease of the above-mentioned density difference. However, by suitably dimensioning the cross-sectional area of the cooling passage and/or of its inlet means, and/or by providing suitable restrictions therein, one can obtain, by natural convection past the cooling means, an air flow rate which may be sufficient until the end of the drying operation while achieving drying of the articles in a reasonable time. Blower means may be used to shorten the drying time, but in this case the time during which the blower means are in operation may be restricted to a relatively short stage of the drying cycle, or there may be required low-power blower means operating during the whole drying cycle.

In a preferred embodiment of the invention which will be described, the progressive decrease of the flow rate past the cooling means is even beneficial, as it will be explained.

A preferred embodiment of the invention will now be described with reference to the attached drawings.

DRAWINGS

FIG. 1 is a partially broken away perspective view of a dryer apparatus according to the preferred embodiment, FIG. 2 is a sectional elevation view of the apparatus of FIG. 1, FIG. 3 is a cross section taken along the line III—III of FIG. 3, and FIG. 4 is a diagram in which some air flow rates Q in m$^3$/h are plotted versus the operation time T (hours) of the apparatus.

DESCRIPTION OF THE PREFERRED EMBODIMENT

Figure 1:
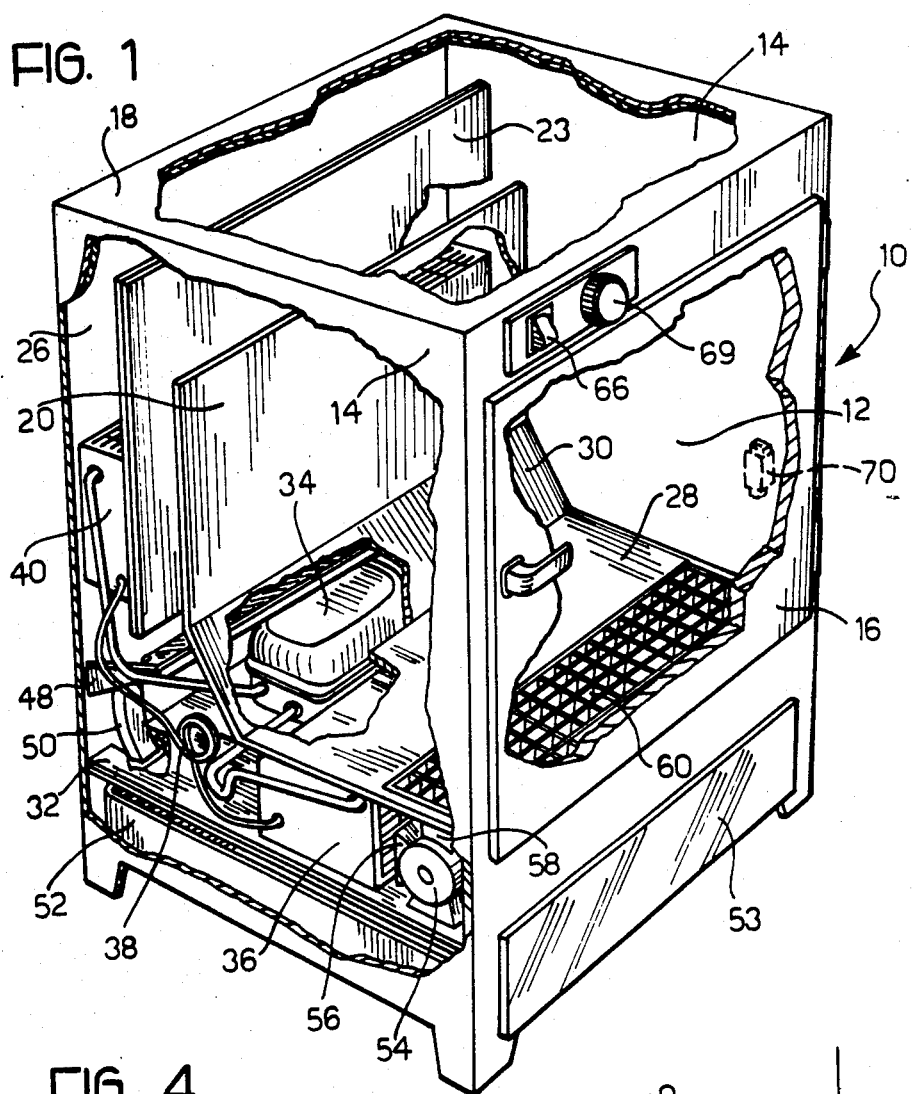

Referring now to FIGS. 1 to 3, a dryer apparatus according to a preferred embodiment of the invention is in the form of a cabinet which comprises a parallelepiped-shaped enclosure 10 which may be of sheet metal or other suitable material.

The enclosure 10 contains a drying chamber 12 which is defined i.a. by side walls 14, a front door 16, a top wall 18 and a back partition wall 20. The walls 14, 18, 20 as well as the front door 16 are provided with thermal insulation.

The back partition wall 20, for the reason which will be made clear below, does not extend up to the top wall 18. The top edge of the partition wall 20 defines with the top wall 18 an inlet means in the form of a horizontal slit 22.

A further vertical partition wall 23 is provided at a distance behind the vertical partition wall 20 and defines therewith an interspace 24 which, as will be seen, constitutes an inlet conduit. The partition wall 23 is provided with thermal insulation. Also the partition wall 23 does not extend up to the top wall 18 of the enclosure. The top edge of the wall 23 defines with the top wall 18 a further inlet means in the form of a horizontal slit 25. The top edge of the wall 23 is situated at a level which is above the level of the top edge of the wall 20.

The enclosure 10 has a back vertical wall or external wall 26 which faces the partition wall 23 and defines therewith a further interspace 27 which, as will be seen, acts as a cooling passage.

The back wall 26 is advantageously of sheet metal or other suitable thermally conducting material to act as cooling means by heat exchange with the external atmosphere. The back wall 26 may be suitably provided with fins (not shown) for better heat exchange efficiency.

The drying chamber 12 has a horizontal bottom wall 28 with which the partition wall 20 merges through an imperforate inclined wall portion 30.

The bottom wall 28 of the drying chamber 12 is located above a horizontal structural wall 32 of the enclosure or cabinet 10. The two horizontal walls 28, 32 define therebetween an interspace which constitutes a heating passage, as will be seen below.

A refrigerating circuit or system is incorporated in the enclosure 10. The refrigerating circuit, which acts as a heat pump, includes, in flow series with each other for the refrigerant, an electric sealed compressor 34, a condenser 36, a throttling element 38 and an evaporator 40. The sealed compressor 34 is of a type normally used in domestic refrigerators. The throttling element 38 may be a capillary tube.

The condenser 36 is in the form of a box-like heat-exchanger which extends across the whole cross-sectional area of the heating passage 34. The condenser-exchanger 36 has horizontal parallel through-channels 42 for allowing air to flow from an inlet space 44 to an outlet space 46 under the bottom wall 28, in the direction of the arrow A.

The evaporator 40 is constituted by a box-like heat exchanger which is very similar to the heat-exchanger 36. The evaporator-exchanger 40 is located in the lower portion of the cooling passage 27, extends across the whole cross sectional area of the passage 27 and has vertical parallel through-channels 45 for allowing air to downwardly flow therethrough in the direction of the arrow B.

The partition wall 40 does not extend downwardly to the bottom wall 32. In this manner the bottom end of the cooling passage 27, under the evaporator 40, is open to inlet space 44; also the bottom end of the conduit 24 is open to the space 44.

A through-shaped receptacle 48 is located at a distance under the bottom open end of the cooling passage 27. A drain pipe 50 extends from the bottom of the receptacle 48 and opens, at its bottom end, above a drip-tray or drawer 52 which is slideably mounted in the cabinet 10 under the bottom wall 32.

As will be better seen below, the receptacle 48 has the function of collecting condensed water which forms in the cooling passage 27 and in the exchanger-evaporator 40 during the operation of the drying apparatus. The condensed water which drips into the receptacle 48 collects in the drawer 52 which can be withdrawn from the cabinet 10. The drawer 52 has a front transparent wall 53, for example of plastics material. This allows to see the water level in the tray or drawer 52 as an indication of the need to periodically remove the drawer 52 to dump the water collected therein. In the alternative, the drain pipe 50 may be directly connected to a water drain system.

An auxiliary electric fan or blower 54 is mounted in the outlet space 46 and extends across at least a portion of the space 46. The blower 54 has an intake mouth 56 which opens in front of the outlet side of the condenser-exchanger 36. An outlet mouth 58 of the blower 54 is directed upwardly towards a grid portion 60 of the bottom wall 28 of the drying chamber 12. The grid portion 60 constitutes the outlet means through which the outlet space 46 communicates with the drying chamber 12 both directly and with the interposition of the auxiliary blower 54.

The compressor 34 is supported on the bottom wall 32 in the inlet or bottom space 44 into which both the cooling passage 27 and the conduit 24 merge at their bottom outlets.

In FIG. 2 the drying chamber 12 has been shown with hanging or suspension members 62 for clothes or articles of laundry 64. With this arrangement the apparatus constitutes a domestic clothes dryer.

In the alternative, grid-like trays could be provided in the drying chamber 12 for drying articles different from clothes, such as for example, photographs, tobacco leaves, fruits or the like.

The drying apparatus as shown and described operates as follows.

When the articles 64 to be dried have been loaded in the drying chamber 12, the door 16 is closed and an on-off start switch 66 on the front of the cabinet is closed to energise the electric motor of the compressor 34. The closure of the switch 66 energizes at the same time a timer 68 diagrammatically shown in FIG. 2. The timer 68 can be manually set by means of a knob 69 (FIG. 1) on the front of the cabinet 10 to preset the operation time of the apparatus depending on the amount and type of the articles to be dried.

The blower 54 may be controlled by the same timer 68 and may be kept in operation during the whole drying cycle to give a contribution to the air circulation which takes place as described below.

In one alternative the timer 68 may be adapted to energise the auxiliary blower 54 during a predetermined time in the drying cycle.

In another alternative the duration of the drying cycle may be controlled by a manually pre-settable humidity sensor 70 located in the drying chamber 12, as shown in dotted lines in FIGS. 1 and 2. The sensor 70 would sense the humidity level in the chamber 12 and would stop the compressor 34 and the blower 54 when the humidity level corresponds to the desired dried condition of the articles.

In still another alternative the auxiliary blower 54 may be controlled by the same sensor 70 or by a distinct sensor (not shown) to start and stop the blower 54 independently from the compressor 34.

When the start switch 66 has been closed, the refrigerant begins to circulate in its circuit. The condenser 36 releases heat to the air in the heating passage. Heated air flows upwardly from the outlet space 46, through the grid 60, into the drying chamber 12, by natural convection and, if necessary, with the aid of the blower 54.

The rising air flow in the drying chamber 12 removes moisture from the articles 64 and reaches the top of the chamber 12.

At the beginning of the cycle convective airflows take place within the drying chamber 12, as shown by the arrows D, and the air in the chamber 12 becomes saturated with moisture released from the articles 64.

Due to the density difference between the moist air in the top of the chamber 12 and the relatively dry air in the bottom space 44, a downwardly directed air flow is induced through the cooling passage 27 and through the channels 45 of the evaporator 40.

Another parallel air flow takes place through the parallel conduit 24. The two air flows merge into the bottom space or inlet space 44. The combined airstream returns to the condenser 36 and flows through its channels 42 in the direction of the arrow A.

The cross-sectional areas of the two top inlet slits 22 and 25 and/or of the remainder of the conduit 24 and the passage 27, respectively, are so dimensioned that a major proportion of the descending air stream which returns to the condenser 36 flows through the conduit 24, while a minor proportion of the descending return air stream flows through the cooling passage 27.

Since the lower edge of the inlet slit 25 is at a level which is higher than that of the lower edge of the inlet slit 22, only air having the highest available moisture contents and thus the lowest density at the very top of the chamber 12 flows into the cooling passage 27. The conduit 24 receives air having a lower moisture content. In this manner it is avoided to undesirably cool the air until it has reached a convenient humidity level for water condensation in the evaporator 40.

Figure 4:
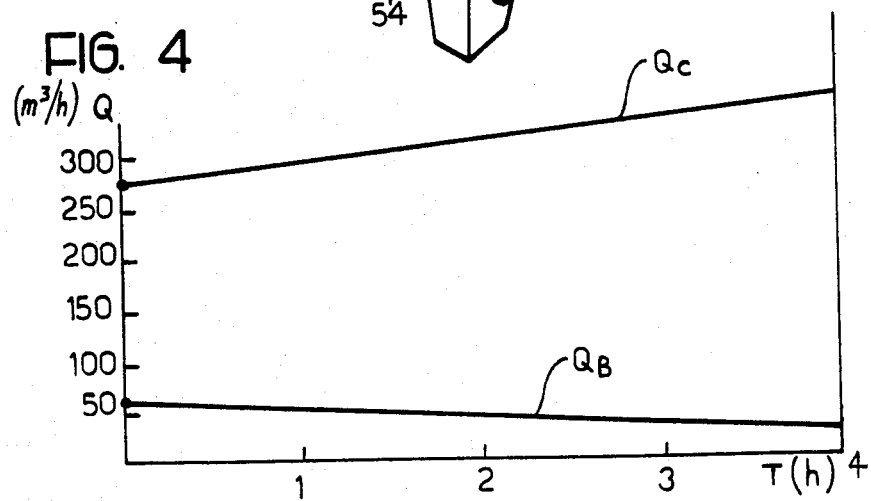

In FIG. 4, the operation times T (hours) are indicated in abscissae and the flow rates Q (m$^3$/h) are indicated in ordinates. The flow rate through the cooling passage 27 is indicated by $Q_B$ and the flow rate through the conduit 24 is indicated by $Q_C$.

Preferable average values of the ratio $Q_B/(Q_B+Q_C)$ are in the range of 0.1 to 0.3 and preferable average values of the ratio $Q_C/(Q_B+Q_C)$ are correspondingly in the range of 0.9 to 0.7.

During the descent of the moist air in the cooling passage 27, which takes place at a relativey low velocity, a proportion of the moisture condensates on the cool wall 26, which acts as preliminary cooling means. The evaporator 40, which is located near the bottom end of the passage 27, receives air which has already lost in part its moisture. The evaporator 40 acts as a further cooling means which finally achieves the condensation of moisture of the air flowing through its channels 45. Condensed water from the cool wall 26 and from the channels 45 drips into the receptacle 48 and then collects into the drawer 52.

The dehumidified air which flows out from the bottom of the cooling passage 27 contributes to the cooling of the compressor 34 before reaching the inlet of the condenser 36.

Due to the presence of the parallel descending passage constituted by the conduit 24, through which the major proportion of the air flow returns to the condenser 36, the thermal energy which the heating means, constituted by the condenser 36, has to release to the air flowing to the drying chamber 12 is essentially that which is necessary to obtain moisture evaporation.

In other words, the sensible heat which has to be dissipated through the heat-exchanger wall 26 and in the evaporator 40 is little more than that of the water vapour, this being due to the relatively small quantity of air which flows at low velocity in the cooling passage 27.

The enthalpy difference of the air across the evaporator 40 increases as the drying cycle proceeds. If the air flow rate $Q_B$ through the evaporator 40 were constant, the evaporator 40 would receive more and more heat and this would demand more and more work to the compressor 34. The electric power consumption to operate the compressor 35 would increase and the whole refrigerating circuit would rise to unacceptable temperature levels. On one hand, this could damage the refrigerating plant. On the other hand, the temperature within the drying chamber 12 could rise to such a level to damage delicate clothes such as those of synthetic fibres, silk and the like.

The refrigerating circuit is so calibrated to attain, at least at the beginning of the drying cycle, an air temperature of about 40°–42° C. in the chamber 12, that is a temperature which allows the drying of the articles 64 in reasonable time and which is not harmful for delicate clothes.

In the absence of the arrangement according to the invention the air temperature would unavoidably increase as far as the drying cycle proceeds, unless special regulating or control means are provided to change the operating parameters of the refrigerating plant.

In the presence of the arrangement according to the invention such regulating or control means are not necessary. It has been found that the flow rate through the evaporator 40 progressively decreases as the drying cycle proceeds, as shown by the line $Q_B$ in FIG. 4. This is due to a progressive decrease of the density difference of the air across the evaporator 40. It is supposed that another factor which contributes to the decrease as shown in $Q_B$ is the following. At the beginning of the drying cycle a great amount of water condensates both on the cool wall 26 and in the channels 45 of the evaporator 40. The condensed water coalesces into large drops or streams which are flushed away by the descending air stream, thus keeping the channels 45 almost completely free. As the drying cycle proceeds, less and less water condensates in the evaporator 40. The formation of large drops progressively decreases and more and more droplets remain adhering to the walls of the channels 45, thus decreasing the cross-sectional areas of the latter with a progressive choking of the air stream.

By suitably dimensioning the cross-sectional area of the cooling passage 27 and/or of its inlet means 25, it is possible to obtain a decrease of the flow rate $Q_B$ therethrough, with a corresponding increase of the flow rate indicated by the line $Q_C$ in FIG. 4, such as to have a self-regulating system in which the quantity of heat exchanged in the evaporator remains practically constant throughout the drying cycle. In other words, the refrigerating system can be maintained in the optimum operation condition throughout the cycle and the temperature in the drying chamber can be kept at the optimum level of about 40°–42° C. for drying delicate clothes.

This self-regulating effect is enhanced by the use of the descending conduit 24. The conduit 24 acts, as it were, as an additional "inverted stack" in parallel with the "inverted stack" constituted by the cooling passage 27. As the downward draught in the cooling passage progressively decreases, as aforesaid, the downward draught in the conduit 24 remains practically constant or slightly increases throughout the operation.

It can be said that the flow rate $Q_B$ is tailored to the cooling capacity of the evaporator. During the early stages of the drying cycle the flowrate $Q_B$ is relatively high just when the moisture contents and the temperature differences between the moist air and the evaporator 40 are high and thus the cooling capacity is at a maximum. As the operation proceeds the moisture contents and the temperature differences decrease. The cooling capacity decreases correspondingly, but less and less work is demanded to the evaporator, since a concurrent decrease of the flowrate $Q_B$ takes place, due to the increase of the natural draught in the cooling passage 27.

It can also be said that the cool wall 26 is tailored to a suitable operation of the apparatus, since its contribution to the cooling increases as the cooling capacity of the evaporator 40 decreases. The increase in cooling capacity of the wall 26 is due to the increase of the temperature difference between the air in the cooling passage 27 and the ambient air around the cabinet 10.

Generally speaking, it can also be said that in a dryer apparatus according to the invention the cooling means comprising the cool wall 26 and the evaporator 40 constitute self-regulation means to decrease the flowrate $Q_B$ through the cooling passage 27 as the heat exchange efficiency of the cooling means decreases. The vice-versa is also true. Thus, for example, if the ambient temperature around the cabinet 10 decreases during the operation cycle of the apparatus, also the heat exchange efficiency of the cool wall 26 increases and the flowrate $Q_B$ undergoes a corresponding increase.

Is has been found that with a drying chamber 12 having a volume of the order of ⅓ of m³, this volume being sufficient to dry a normal laundry batch of 5 Kg, a compressor 34 of 350 W was sufficient to dry the clothes with a drying cycle of 4 hours. The blower 54 was driven by an electric motor of 25 W.

After a four-hour cycle the clothes taken from the drying apparatus had a moisture content as is usually required for pressing. When the cycle was extended to one hour more, that is to five hours, the clothes appeared to be "fluff-dry".

I claim:

1. In a dryer apparatus comprising an enclosure which contains a drying chamber for receiving articles to be dried, an air return heating passage and an air return cooling passage, wherein the heating passage is situated underneath the drying chamber and has inlet means and outlet means communicating therewith on opposite sides of the said chamber, respectively, air heating means being provided in the heating passage between the inlet and the outlet means thereof to heat air flowing through said heating passage, and wherein the cooling passage is vertically disposed adjacent the drying chamber and has inlet means through which the drying chamber communicates with the top of the cooling passage and outlet means at the bottom of the cooling passage, which outlet means communicate with the heating passage upstream of the heating means thereof, air cooling means being provided in the cooling passage between the inlet and outlet means thereof to condense moisture from air flowing downwardly in the cooling passage, and water collecting or draining means being provided underneath the outlet means of the cooling passage to collect the water dripping from the cooling means, the arrangement being such that a major air flow is circulated between the drying chamber and the heating passage and a minor air flow is circulated from the drying chamber to the heating passage through the cooling passage, the improvement wherein the inlet means of said cooling passage is disposed in closely spaced relation to and directly communicates with the top of the drying chamber and is disposed at the top of the vertically disposed cooling passage whereby only air having the highest available moisture and the lowest density at the top of the drying chamber will flow into the cooling passage.

2. The dryer apparatus as claimed in claim 1, wherein the inlet means of said air return heating passage are situated at least in part at a level which is lower than the level of the inlet means of said air return cooling passage.

3. The dryer apparatus as claimed in claim 2, wherein the inlet means of said heating passage are in the form of a substantially vertical inlet conduit which extends adjacent the vertically disposed cooling passage and has inlet means situated at the top of the conduit in communication with the top of the drying chamber, and bottom outlet means which communicate with the heating passage near the bottom outlet means of the cooling passage.

4. The dryer apparatus as claimed in any of claims 1 to 3 wherein the cooling passage is an interspace between two vertical walls facing each other, one of which is an external wall of the enclosure, said external wall being thermally conductive to act, at least in part, as cooling means for condensing moisture from the air.

5. The dryer apparatus as claimed in claim 3, wherein the cooling passage is a first interspace between a vertical external thermally conducting wall of the enclosure and a first thermally insulating vertical partition wall in the enclosure, and the inlet conduit is a second interspace between said first partition wall and a second vertical partition wall which separates the second interspace from the drying chamber, said inlet means of the cooling passage and of the inlet conduit being in the form of respective apertures in the upper portions of the partition walls.

6. A dryer apparatus comprising an enclosure which contains a drying chamber for receiving articles to be dried, an air return heating passage and an air return cooling passage, wherein the heating passage is situated underneath the drying chamber and has inlet means and outlet means communicating therewith on opposite sides of the said chamber, respectively, air heating means being provided in the heating passage between the inlet and the outlet means thereof to heat air flowing through said heating passage, wherein the cooling passage is vertically disposed adjacent the drying chamber and has inlet means through which the top of the drying chamber directly communicates with the top of the cooling passage and outlet means at the bottom of the cooling passage, the inlet means of said cooling passage being situated in closely spaced relation to the top of the drying chamber and at the top of the cooling passage and the outlet means of said cooling passage communicating with the heating passage upstream of the heating means therein, air cooling means being provided in the cooling passage between the inlet and outlet means thereof to condense moisture from air flowing downwardly in the cooling passage, and water collecting or draining means being provided underneath the outlet means of the cooling passage to collect the water dripping from the cooling means, and wherein a refrigerating circuit, acting as a heat pump, is incorporated in said enclosure, said refrigerating circuit including an electric sealed compressor, a condenser, a throttling element and an evaporator in flow series with each other, the condenser and the evaporator being in the form of respective heat exchangers to constitute, at least in part, said air heating means and said air cooling means respectively, the arrangement being such that a major air flow is circulated between the drying chamber and the heating passage and a minor air flow of the air having the highest moisture content and lowest density adjacent the top of the drying chamber is circulated from the drying chamber to the heating passage through the cooling passage.

7. The dryer apparatus as claimed in claim 6, wherein the inlet means of said air return heating passage are situated at least in part at a level which is lower than the level of the inlet means of said air return cooling passage.

8. The dryer apparatus as claimed in claim 7 wherein the inlet means of said heating passage are in the form of a substantially vertical inlet conduit which extends adjacent the vertically disposed cooling passage and has inlet means situated at the top of the conduit in communication with the top of the drying chamber, and bottom outlet means which communicate with the heating passage near the bottom outlet means of the cooling passage.

9. The dryer apparatus as claimed in any of claims 7 to 8 wherein the cooling passage is an interspace between two vertical walls facing each other, one of which is an external wall of the enclosure, said external wall being thermally conductive to act, at least in part, as cooling means for condensing moisture from the air flowing therealong.

10. The dryer apparatus as claimed in claim 8, wherein the cooling passage is a first interspace between a vertical external thermally conducting wall of the enclosure and a first thermally insulating vertical partition wall in the enclosure, and the inlet conduit is a second interspace between said first partition wall and a second vertical partition wall which separates the second interspace from the drying chamber, said inlet means of the cooling passage and of the inlet conduit being in the form of respective apertures in the upper portions of the partition walls.

11. The dryer apparatus as claimed in claim 7, wherein said heat exchangers extend across the whole cross-sectional areas of the respective passages to be traversed by the whole of the respective air flows in said passages.

12. The dryer apparatus as claimed in claim 7 or claim 11, wherein the cooling passage is an interspace between two vertical walls facing each other, one of which is an external wall of the enclosure, said external wall being thermally conductive to act as preliminary cooling means for condensing a first proportion of moisture from the air flowing therealong, and the evaporator is situated in a lower portion of the cooling passage for achieving the condensation of moisture from the air flowing therethrough.

13. The dryer apparatus as claimed in claim 7, wherein pre-settable timer means are provided to de-energise said compressor at the end of a predetermined operation time.

14. The dryer apparatus as claimed in claim 13, wherein auxiliary electric blower means are incorporated in said heating passage to enhance said major and minor air flows at least for a predetermined time during the operation of the apparatus, said blower means being controlled by said timer means.

15. The dryer apparatus as claimed in claim 7, wherein pre-settable humidity sensing means are provided in the drying chamber to de-energise said compressor when the humidity in the drying chamber descends below a predetermined value.

16. The dryer apparatus as claimed in claim 15, wherein auxiliary electric blower means are incorporated in said heating passage to enhance said major and minor air flows at least for a predetermined time during the operation of the apparatus, said blower means being controlled by said humidity sensing means.

17. A dryer apparatus comprising an enclosure which contains a drying chamber for receiving articles to be dried, an air return heating passage and an air return cooling passage, wherein the heating passage is situated underneath the drying chamber and has inlet means and outlet means communicating therewith on opposite sides of the said chamber, respectively, air heating means being provided in the heating passage between the inlet and the outlet means thereof to heat air flowing through said heating passage, and wherein the cooling passage is vertically disposed adjacent the drying chamber and has inlet means through which the top of the drying chamber directly communicates with the top of the cooling passage and outlet means at the bottom of the cooling passage, which outlet means communicate with the heating passage upstream of the heating means thereof, air cooling means being provided in the cooling cooling passage between the inlet and outlet means thereof to condense moisture from air flowing downwardly in the cooling passage, and water collecting or draining means being provided underneath the outlet means of the cooling passage to collect the water dripping from the cooling means, the arrangement being such that a major air flow is circulated between the drying chamber and the heating passage and a minor air flow of the air having the highest moisture content and lowest density adjacent the top of the drying chamber is circulated from the drying chamber to the heating passage through the cooling passage, and regulating means being provided to decrease the flowrate through the cooling passage as the heat exchange efficiency of the cooling means decreases and vice-versa.

18. The dryer apparatus as claimed in claim 17, wherein the inlet means of said cooling passage is disposed in closely spaced relation to the the top of the drying chamber and is disposed at top of the vertically disposed cooling passage, wherein a refrigerating circuit, acting as a heat pump, is incorporated in said enclosure, said refrigerating circuit including an electric sealed compressor, a condenser, a throttling element and an evaporator in flow series with each other, the condenser and the evaporator being in the form of respective heat exchangers to constitute, at least in part, said air heating means and said air cooling means, respectively, and said regulating means being constituted, at least in part, by said evaporator.

19. The dryer apparatus as claimed in claim 18, wherein the cooling passage is an interspace between two vertical walls facing each other, one of which is an external wall of the enclosure, said external wall being thermally conductive to act, at least in part, as cooling means for condensing moisture from the air flowing therealong, and said external wall constituting a part of said regulating means.

20. The dryer apparatus as claimed in claim 19, wherein the evaporator is situated in a lower portion of the cooling passage.

21. The dryer apparatus as claimed in claim 17, wherein the cooling passage is an interspace between two vertical walls facing each other, one of which is an external wall of the of the enclosure, said external wall being thermally conductive to act, at least in part, as cooling means for condensing moisture from the air flowing therealong, and said regulating means being constituted, at least in part, by said evaporator, and wherein the inlet means of said interspace are situated at the top of both the drying chamber and the cooling passage.

* * * * *